United States Patent [19]

Ando et al.

[11] 4,022,368
[45] May 10, 1977

[54] TAPE CARTRIDGE HAVING ENHANCED TAPE DRIVE FACILITIES

[75] Inventors: Takao Ando, Ebina; Hiroshi Fujikura, Fujisawa; Norishige Suzuki, Tokyo; Akira Watanabe, Yokohama, all of Japan

[73] Assignee: International Business Machines Corporation, Armonk, N.Y.

[22] Filed: Apr. 26, 1976

[21] Appl. No.: 680,397

[30] Foreign Application Priority Data

Aug. 29, 1975 Japan .......................... 50-104074

[52] U.S. Cl. .............................................. 226/118
[51] Int. Cl.² ........................................... B65H 17/42
[58] Field of Search .......... 226/118, 119, 181, 187, 226/196; 242/55.19 A, 182–185; 360/93

[56] References Cited

UNITED STATES PATENTS

| | | | |
|---|---|---|---|
| 2,899,507 | 8/1959 | Martel | 226/118 X |
| 3,021,989 | 2/1962 | Sellers | 226/118 |
| 3,265,817 | 8/1966 | Gilman | 226/118 X |
| 3,563,435 | 2/1971 | Whitehead | 226/118 X |
| 3,572,568 | 3/1971 | Lutz | 242/55.19 A X |
| 3,913,814 | 10/1975 | Suzuki | 226/187 |

Primary Examiner—Richard A. Schacher
Attorney, Agent, or Firm—Herbert F. Somermeyer

[57] ABSTRACT

A tape-containing cartridge accommodates an endless tape either in the form of random loops or in the form of a tape roll wound on a single reel. A tape passageway extends the cartridge from a cavity adjacent a back wall, thence between a first side wall and a first internal wall past pad means and thence between a front wall and a second internal wall past a transducer-receiving opening formed in the front wall and thence between a pinch roller and portions of the front and second side walls into the cavity. The second side wall has an opening facing the pinch roller for receiving an external capstan. A positional relationship between the pinch roller and the capstan is selected such that a tangential force line at the contact point of the pinch roller and the capstan points inwards of the second side wall. An inward protrusion and a rotatably mounted guide roller provide a limited opening at the entry to the tape passageway to prevent tape creasing at the entry, while limiting drag on the tape.

7 Claims, 27 Drawing Figures

FIG. 5F
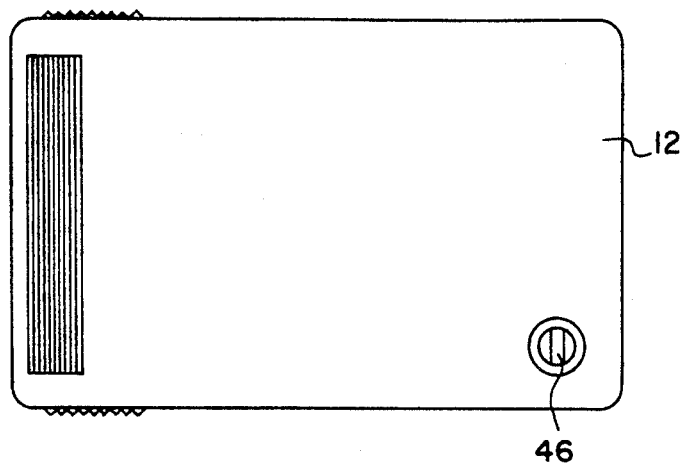
FIG. 5E
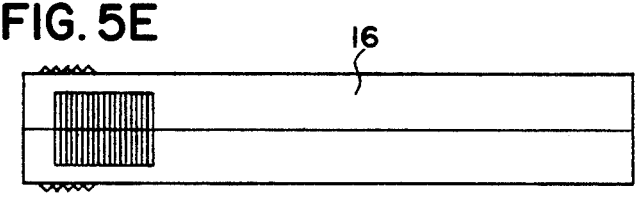
FIG. 5D  FIG. 5C  FIG. 5B
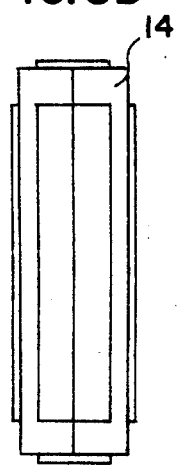 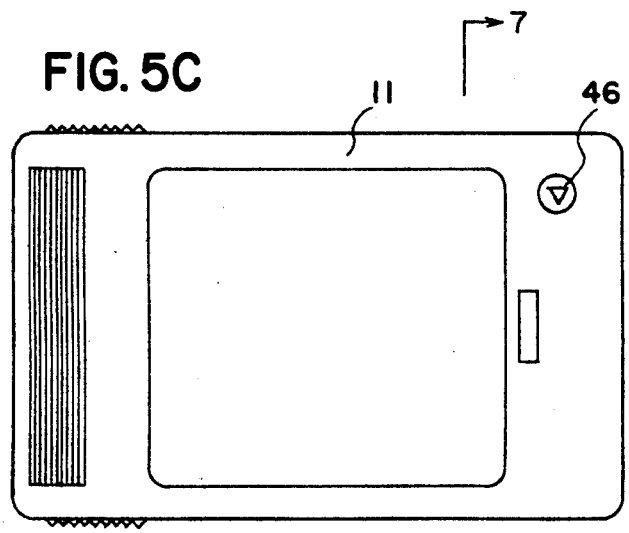 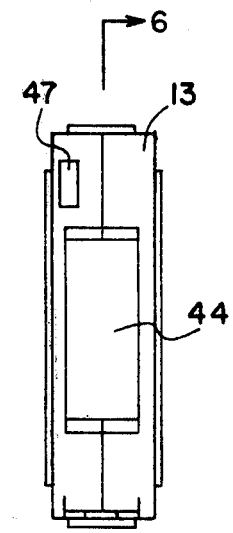
FIG. 5A
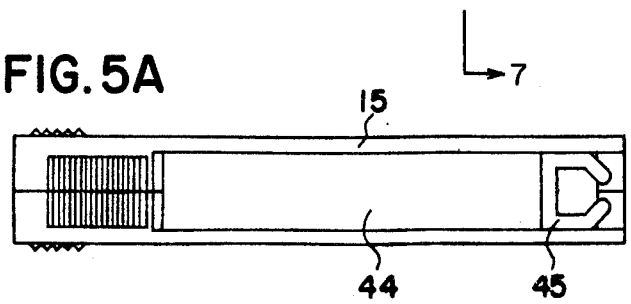

TAPE CARTRIDGE HAVING ENHANCED TAPE DRIVE FACILITIES

BACKGROUND OF THE INVENTION

The present invention relates generally to a tape cartridge and more particularly to a tape cartridge structure for storing a magnetic recording tape in a manner to enable smooth movements of the tape in the cartridge without causing unintended tape protrusion out of the cartridge, tape creasing without the cartridge, and undue drag on tape movements.

Various types of tape cartridges are known for storing a tape, such as a magnetic tape or an ink ribbon formed as an endless tape. Such tape cartridge has a tape receiving cavity for holding the tape in a tape roll wound on a single reel or as a plurality of random loops without using any reel. Tape moves along predetermined tape passageways by driving forces applied to the tape.

A typical example of an endless tape cartridge using a reel is a magnetic tape cartridge having an endless magnetic tape wound on a single reel. The tape is taken from the spool at its innermost end, guided along predetermined tape passageways, and then returned to the outermost end of said tape spool.

A typical example of an endless tape cartridge for storing an endless tape in the form of random loops includes a hollow container in the shape of a flat and substantially rectangular parallelepiped. The magnetic tape moves around a portion of the outer periphery of a pinch roller mounted in the container adjacent to a corner defined by a front wall and a side wall of said container, thence into a wide tape receiving cavity in the container; there the tape is stored as a plurality of folded ramdom loops. From the cavity, the tape moves through tape passageways extending along the other side wall and the front wall, and returned back to the pinch roller. The front wall is provided with an opening for receiving a magnetic head and another opening for receiving an external capstan. The magnetic head engages the tape at the same time the capstan cooperates with the pinch roller to drive the tape by the rotation of the capstan.

The prior art tape cartridges of the type described above after encounter problems of tape protrusion out of the capstan opening in the front wall of the cartridge and tape creasing in a narrow tape path adjacent the capstan. The problem of tape protrusion has been caused due to the fact that the narrow tape path along the outer periphery of the pinch roller is located downstream of the contact point between the capstan and the pinch roller with respect to the direction of the tape movement. Here the tape makes frictional contact with a stationary wall of the narrow tape path, resulting in increased drag on the tape whereby causing tape protrusion out of the capstan opening immediately downstream of said capstan-pinch roller contact point. One such tape protrusion occurs, the tape within the cartridge continues outwardly more and more requiring operator intervention. Such protruded tape can entangle or twist about external components, and thereby suffer damages from cutting, creasing, etc., and its feeding operation becoming impossible.

The problem of tape creasing has also been caused when the tape is wrinkled or jammed by being caught by the stationary wall defining the narrow tape path applying undue drag on the tape. Such tape creasing can cause signal dropout errors resulting in data errors when the magnetic tape is used in a digital data recorder. Although several approaches have been suggested heretofore to prevent such problems of tape protrusion and tape creasing, none of them fully satisfies the strict reliability requirements for digital data recording.

Prior art tape cartridges for storing an endless tape in the form of random loops have also encountered the problems of tape creasing and undue drag to the tape movement caused at the entry of the tape passageway extending along the side wall of the cartridge when the tape in the form of random loops is guided from the wide tape receiving cavity into the narrow tape passageway. Such problems occur when the tape stored in the wide tape receiving cavity in the form of random loops is guided into the narrow tape passageway. That is, some of the tape loops near the entry of the tape passageway are simultaneously guided into the tape passageway resulting in creasing or a portion of the tape being guided into the tape passageway receives undue drag from other adjacent tape loops. Although several approaches have also been suggested heretofore to prevent such problems, none of them fully satisfies strict reliability requirements for digital data recording.

SUMMARY OF THE INVENTION

Accordingly, it is an object of the present invention to provide a tape cartridge which enables the smooth movement of the tape without causing tape protrusion out of said cartridge, tape jamming or tape creasing within said cartridge while avoiding undue drag to the tape movement.

One of the features of the present invention pertains to the point of applying driving force to the tape; the capstan-pinch roller contact point is located near the downstream end of the narrow tape path defined between a portion of the outer periphery of the pinch roller and an inner wall of the cartridge extending along said portion rather than near the upstream end thereof. As the result, the tape is driven so as not to be pushed into but is pulled out of the tape path extending along a portion of the outer periphery of the pinch roller which would otherwise cause undue drag to the tape movement. Therefore, the tape may be kept in close contact with the outer periphery of the pinch roller within said tape path without making any frictional contact with the inner wall facing thereto, thereby preventing the tape from jamming, protruding or creasing.

A second feature of the present invention provides juxtaposed internal protrusion and a guide roller which cooperate to prevent a plurality of tape loops from being guided simultaneously into a tape passageway and at the same time prevent undue drag from being applied to the portion of the tape being guided into the tape passageway. Such feature is particularly useful when tape is stored in a wide tape receiving cavity within the cartridge as a plurality of random loops.

The foregoing and other features and advantages of the invention will be apparent from the following more particular description of preferred embodiments of the invention, as illustrated in the accompanying drawings.

THE DRAWING

FIGS. 5A through 5F are six views of the tape cartridge shown in FIG. 4A.

DETAILED DESCRIPTION

Figure 1:
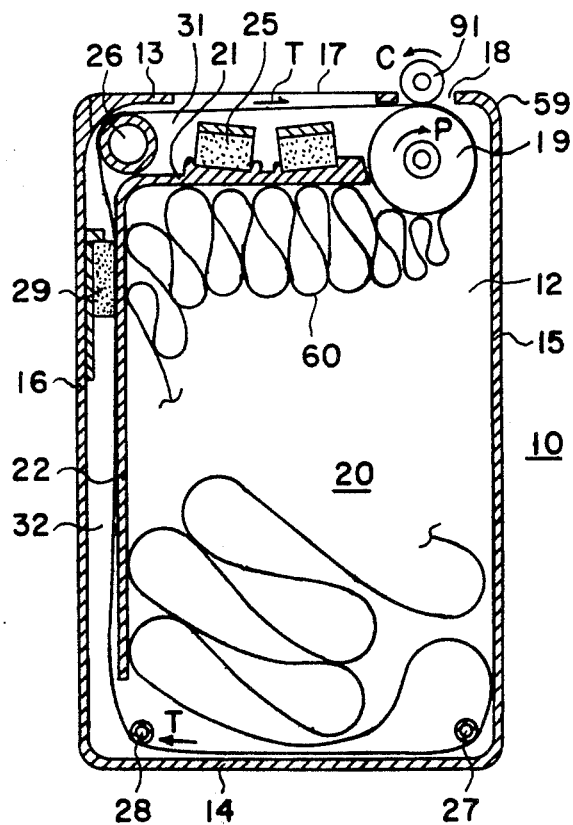
FIG. 1 is a plan view showing a prior art random-loop type endless tape cartridge with the top plate removed to illustrate the internal structure.

Referring now to the drawings, like numerals indicate corresponding parts and features in the various figures, both in the prior art and preferred embodiment. The prior art tape cartridges will be first described more in detail a shown in FIGS. 1 – 3 and then the present invention will be explained more in detail with particular reference to preferred embodiment.

DETAILED DESCRIPTION OF PRIOR ART

FIG. 1 is a plan view showing a prior art endless magnetic tape cartridge with the top plate removed to illustrate the internal structure. The tape cartridge 10 comprises a hollow container in the shape of a flat and substantially rectangular parallelepiped consisting of a pair of facing front and back walls 13 and 14, a pair of facing side walls 15 and 16, and a facing top wall (not shown) and bottom wall 12. A pinch roller 19 is rotatably mounted near a corner 59 defined by front wall 13 and side wall 15. Internal walls 22 and 21 extend along side wall 16 and front wall 13, respectively, to form tape passageways 32 and 31, respectively, for guiding tape 60. The remaining space within the tape cartridge 10 comprises a tape receiving cavity 20 for storing tape 60 in the form of folded random loops. The magnetic tape 60 is guided from pinch roller 19 into the tape receiving cavity 20, thence past stationary guide poles 27 and 28 into the tape passageway 32, where back tension is applied to the tape 60 by felt pad 29 and thence past stationary guide pole 26 into the tape passageway 31 along front wall 13 back to pinch roller 19. Front wall 13 of the tape cartridge 10 has openings 17 and 18 for receiving a magnetic head (not shown) and a capstan 91, respectively, of a tape cartridge player (not shown). Between opening 17 and the internal wall 21, there is provided another pad 25 made of an elastic material such as urethane foams, for example, for resiliently pressing the tape 60 against the magnetic head (not shown). In this situation, when the capstan 91 is rotated by a source of driving force (not shown) in the direction indicated by an arrow C, pinch roller 19 is rotated in the direction indicated by an arrow P, thereby causing the tape 60 to be driven in the direction indicated by an arrow T.

Figure 2A:
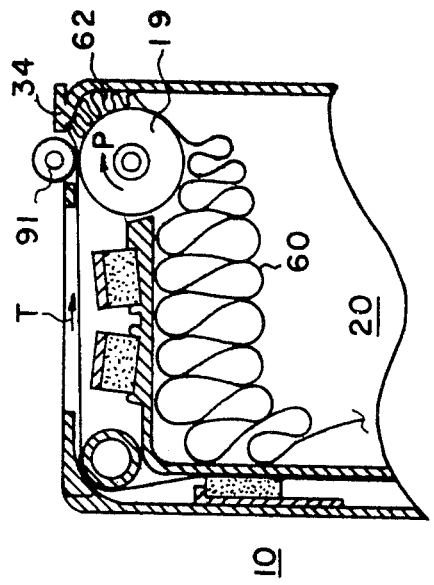
FIGS. 2A through 2D illustrate the problems of tape protrusion and tape jamming of the prior art endless tape cartridges and some prior solutions therefor.

The problems often encountered in this type of prior art magnetic tape cartridge are tape protrusion out of a clearance in the capstan receiving opening 18, such as shown in FIG. 2A, tape jamming and tape creasing in a narrow tape path along a portion of the outer periphery of the pinch roller 19 caused when the tape makes frictional contact with the inner wall of the tape cartridge facing to the pinch roller. Once a tape loop 61 (FIG. 2A) is formed outside the tape cartridge, the tape cannot be driven through the narrow path along the outer periphery of the pinch roller any more but the tape loop 61 becomes larger and larger until all the tape 60 within the tape receiving cavity of the cartridge is forced out of tape cartridge 10. In such a situation, the protruded tape 61 would generally be entangled or cut, resulting in making the tape inoperative. Even when the tape 61 is not protruded out of the tape cartridge, tape creasing caused because the tape is caught by the stationary wall in the narrow tape path results in dropout errors, and further tape jamming in the narrow tape path results in stopping the tape feeding operation or temporarily reducing tape speed.

Figure 2B:
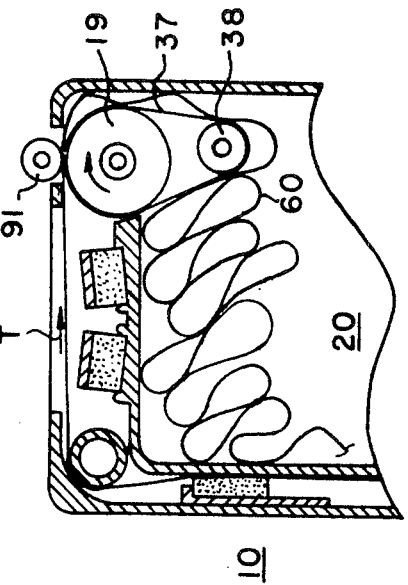
Figure 2C:
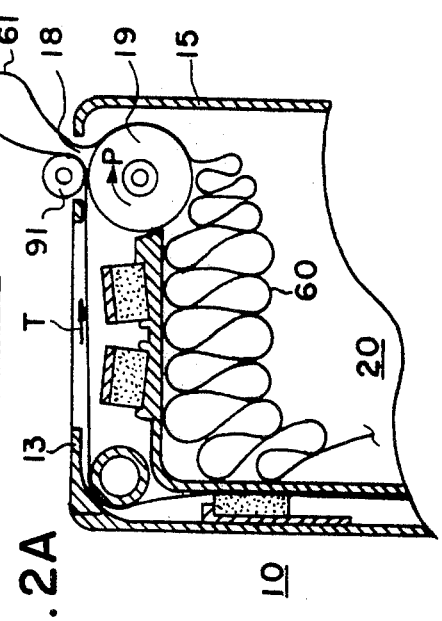
Figure 2D:
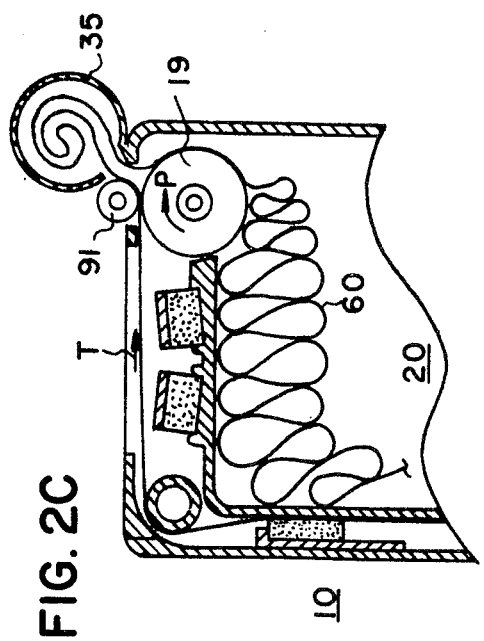

An approach to solve the problem of such tape protrusion has been suggested as shown in FIGS. 2B and 2C. The structure of FIG. 2B has a strip 34 provided to cover the clearance in the capstan receiving opening 18, while the structure of FIG. 2C has a tape reservoir 35 provided to receive the protruded tape therein. Also, another approach to solve the problem of tape protrusion has been suggested as shown in FIG. 2D. Here the tape 60 is forcibly guided into the tape receiving cavity 20 by means of frictional belt 37 stretched between pinch roller 19 and guide roller 38. However, in the structure of FIG. 2B, although tape protrusion is largely prevented, tape creasing as shown in 62 still occurs. The problem of the frictional contact between tape 60 and the stationary cartridge wall 15 in the narrow tape path has not yet been solved. The structure of FIG. 2C may protect the protruded tape, but not solve the problem of tape protrusion itself. Also, in the structure shown in FIG. 2D, since the tape may not always make close contact with the frictional belt 37, the problem of the frictional contact between tape 60 and the stationary wall 15 of the cartridge has not yet been solved.

Figure 13B:
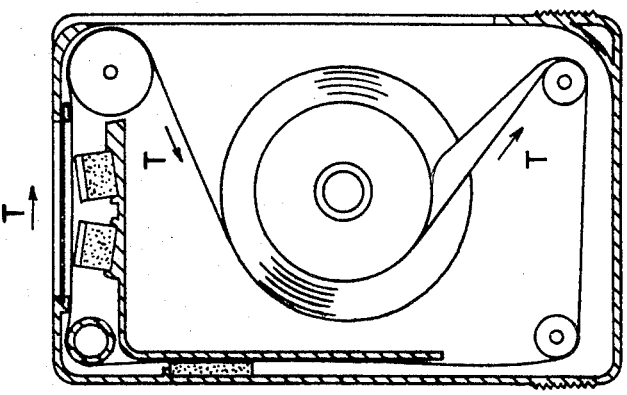
FIGS. 13A and 13B show another embodiment of this invention wherein the present invention is applied to a single-reel type endless tape cartridge.
Figure 13A:
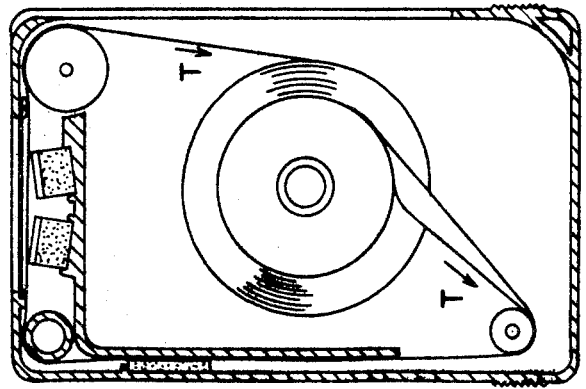

The protrusion problem of the formation of the exterior tape loop 61, as shown in FIG. 2A, has been often encountered, not only in said type of endless tape cartridge for storing the tape therein in the form of random loops, but also in the single-reel type endless tape cartridges as shown in FIGS. 13A and 13B. This protrusion occurs when the tape would on a reel becomes loose while the tape cartridge is carried or stored. Therefore, even though some effective approach to solve such problems has been demanded for the single-reel type endless tape cartridges, no such solution has been forthcoming.

Figure 3A:
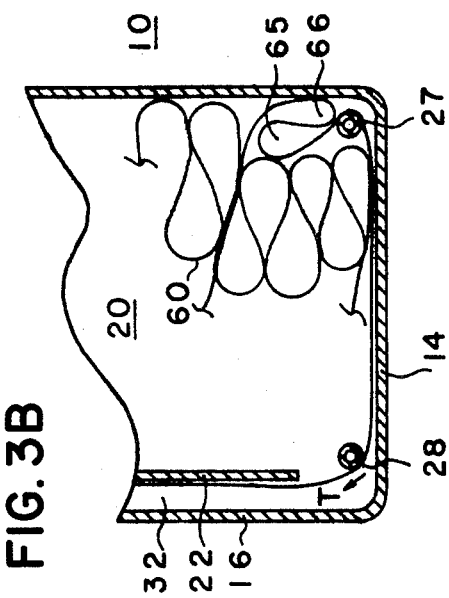
FIGS. 3A and 3B illustrate the problems of tape creasing and undue drag to the tape movement caused near the entry of the tape passageway in the prior art endless tape cartridge shown in FIG. 1.
Figure 3B:
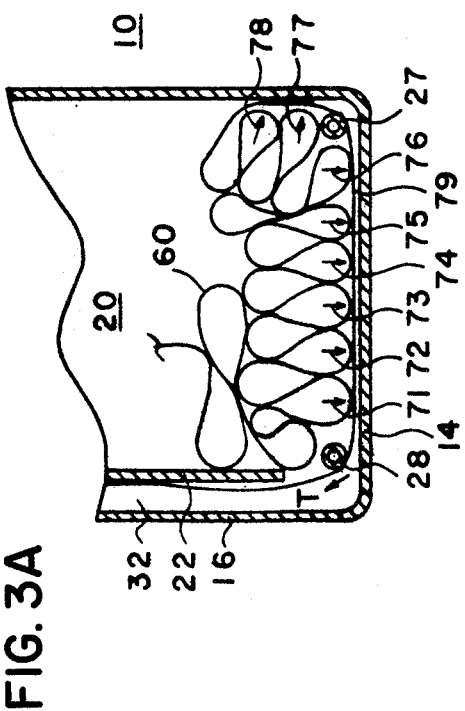

Other problems encountered in prior art magnetic tape cartridges for storing tape 60 therein in the form of random loops is tape creasing and undue drag to the tape movement caused at the entry of the tape passageway 32 (FIG. 1). In this type of tape cartridge, the tape is stored in the form of a plurality of loops folded quite at random. FIGS. 3A and 3B show two typical examples of such tape loop patterns to be formed in the use of this type of tape cartridge. In FIG. 3A, tape 60 is shown as having tape loops 71, 72, 73, 74, 75, 76, 77 and 78 formed in this sequence. The unfolded tape portion 79 is guided past the stationary guide poles 27 and 28 into the tape passageway 32. In this case, since tape loops 71 through 78 apply pressure on the unfolded tape portion 79 in the directions indicated by the arrows, undue drag is applied to the tape 60 movement. As a result, tape 60 is compelled to make undesired frictional contact with bottom wall 14 between the stationary guide poles 27 and 28. Such frictional contact may result in reduction of tape speed, stopping the tape, stretching the tape, or damaging the magnetic coating of the tape. FIG. 3B shows another typical example of the tape loop pattern to be formed during the operation of such a tape cartridge, wherein the tape 60 is guided from a tape loop 66, via the tape loop 65, thence past the stationary guide poles 27 and 28, into the tape passageway 32. In this instance, since the top (portion adjacent guide pole 27) of the loop 66 is simultaneously guided around the stationary guide pole 27 as the tape loop 65 is guided around guide pole 27, tape creasing occurs in a narrow tape path defined between said guide pole 27 and back wall 14.

Thus, in the prior art endless tape cartridges, there have been caused not only the problems of tape jamming, tape creasing and tape protrusion out of the clearance in the capstan receiving opening near the pinch roller, but also the problems of tape creasing and undue drag to the tape movement near the entry of the tape passageway from the narrow tape receiving cavity, all of which prevents smooth movement of the tape and causing damage thereto.

DETAILED DESCRIPTION OF A PREFERRED EMBODIMENT

The present invention provides an improved tape cartridge wherein the above mentioned drawbacks experienced in prior art tape cartridge as illustrated above have been solved. Next, referring to FIGS. 4 through 12, the present invention is explained with reference to a preferred embodiment.

Figure 4A:
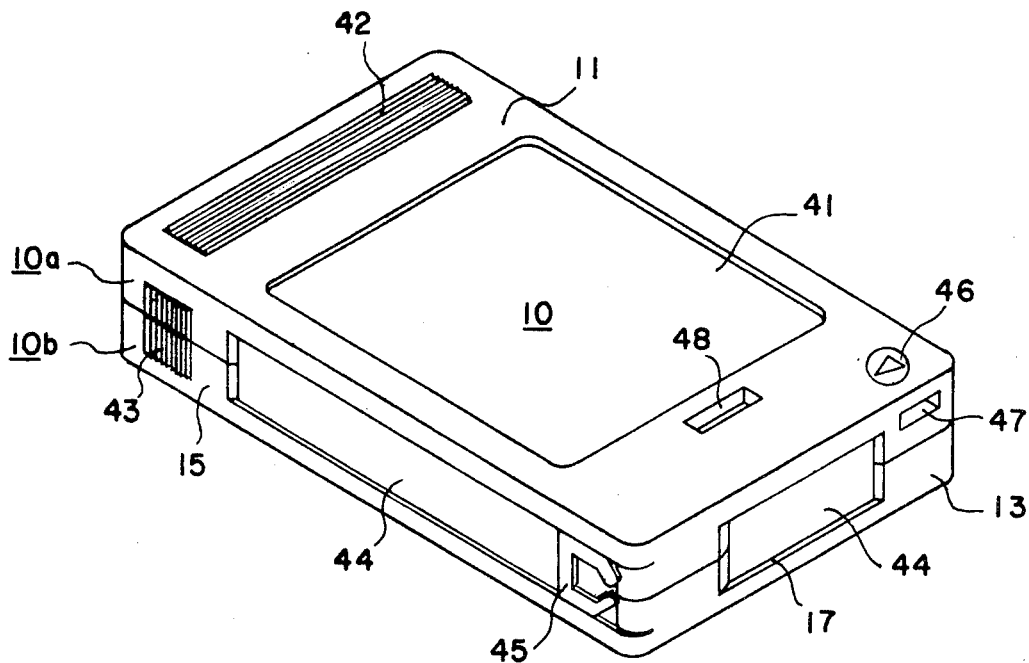
FIGS. 4A and 4B are perspective views illustrating the external appearance of a tape cartridge constructed in accordance with the present invention; a shutter being closed and opened, respectively.
Figure 4B:
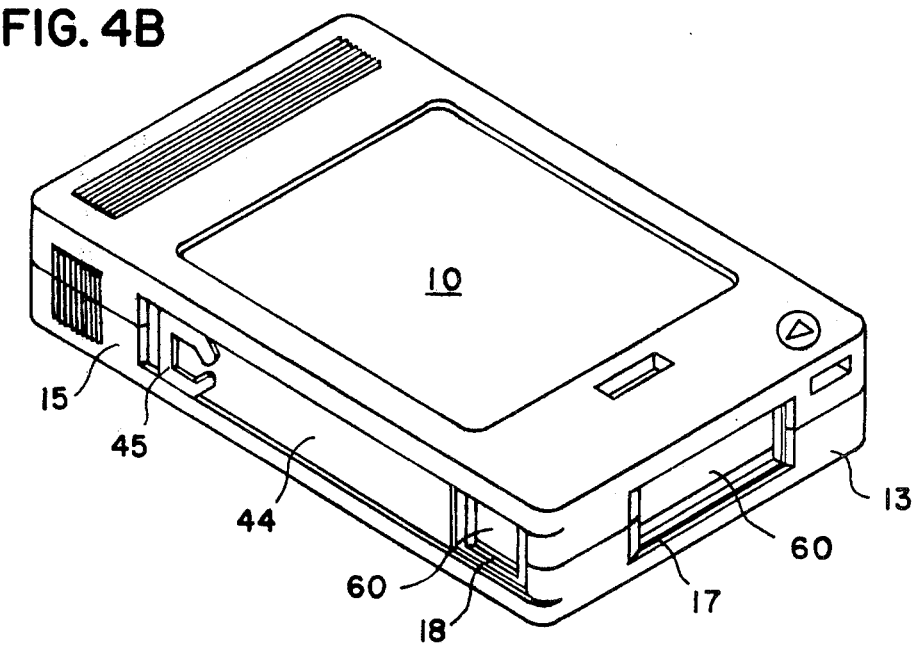

FIGS. 4A and 4B are perspective views illustrating the external appearances of an endless tape cartridge in accordance with the present invention, with a shutter 44 being closed and opened, respectively. FIGS. 5A through 5F show six views of the tape cartridge shown in FIG. 4A.

Referring to FIGS. 4A through 5F, tape cartridge 10 built in accordance with the present invention comprises a hollow container in the shape of a flat and substantially rectangular parallelepiped consisting of a pair of facing top and bottom walls 11 and 12, a pair of facing front and back walls 13 and 14 joining said top and bottom walls, and a pair of facing first and second side walls 16 and 15 joining the other walls. In practice, the tape cartridge 10 is preferably fabricated by a plastic molding technique, whereby an upper half 10a and a lower half 10b are separately formed respectively as an integral unit and then joined together by appropriate means (not shown).

Through a head receiving opening 17, an external magnetic read/write head (not shown) is brought into contact with magnetic tape 60 within tape cartridge 10. An external capstan (not shown) enters cartridge 10 through opening 18 to drivingly engage with tape 60 against a pinch roller 19 (FIG. 6) within tape cartridge 10. As will be described later in detail, it is an important feature of the present invention that the capstan receiving opening 18 is provided in side wall 15 rather than in the front wall 13 as in the prior art tape cartridges. A slidable flexible shutter 44 protects the tape within the tape cartridge from dust and scratches due to external physical force by covering the openings 17 and 18 when the tape cartridge 10 is not being used, namely when it has been removed from the tape cartridge player. A detent 45 attached to flexible shutter 44 cooperates with a shutter opening and closing mechanism (FIG. 9) of the tape cartridge player to be described later such that the shutter is automatically opened and closed as the tape cartridge is inserted into the removed from the tape player. FIG. 4A illustrates the state of the tape cartridge 10 where the openings 17 and 18 have been completely covered by the shutter 44, while FIG. 4B illustrates the state of tape cartridge 10 in its opening position where the tape 60 within the tape cartridge is exposed via openings 17 and 18.

In a recessed area 41 at the center of the top wall 11, a label (not shown) on which desired data is to be written may be attached as desired. A recess 48 in wall 11 engages a later described cartridge retainer 112 so that tape cartridge 10 may be retained in a fixed position after insertion into the tape cartridge player. A write protection knob 46, which is manually rotatable about its vertical axis between the position indicated and the position rotated by 180° therefrom, is constructed to cover an opening 47 from the inside at the position indicated but not at the position rotated by 180° therefrom. Write protection prevents other data from being written by mistake onto the tape 60. Such opening 47 closure is sensed by a tape player by arranging an actuation arm of a microswitch (not shown) so that a contact of the microswitch may be switched on and off according to the opened and covered states of the opening 47. Knurlings 42 and 43 prevent the slip of the tape cartridge 10 when an operator inserts it into or removes it from the cartridge housing of the tape cartridge player.

Figure 6:
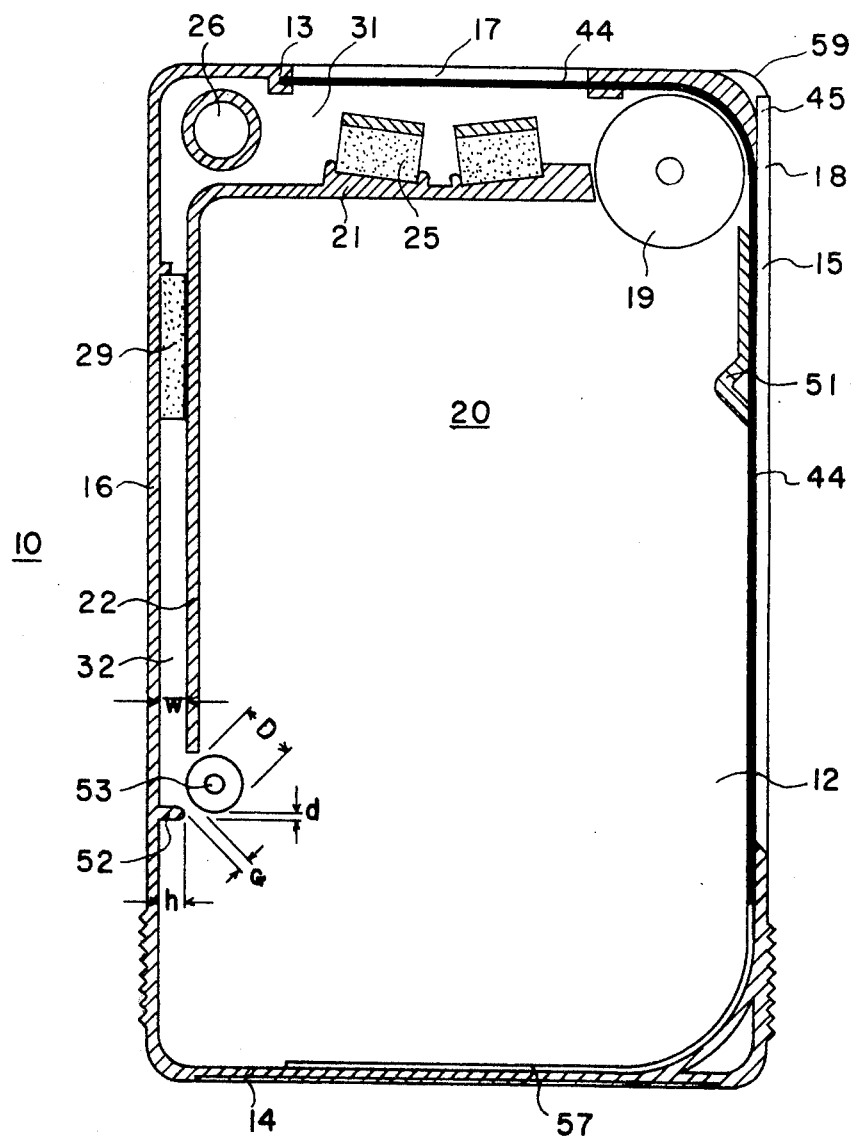
FIGS. 6 and 7 are enlarged sectional views respectively taken along the lines VI — VI and VII — VII of FIG. 5B and 5C in the directions of the arrows and with the tape removed for the purposes of clarity.
Figure 7:
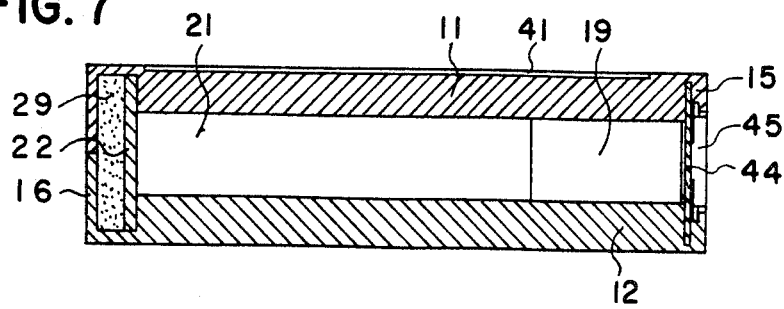
Figure 8:
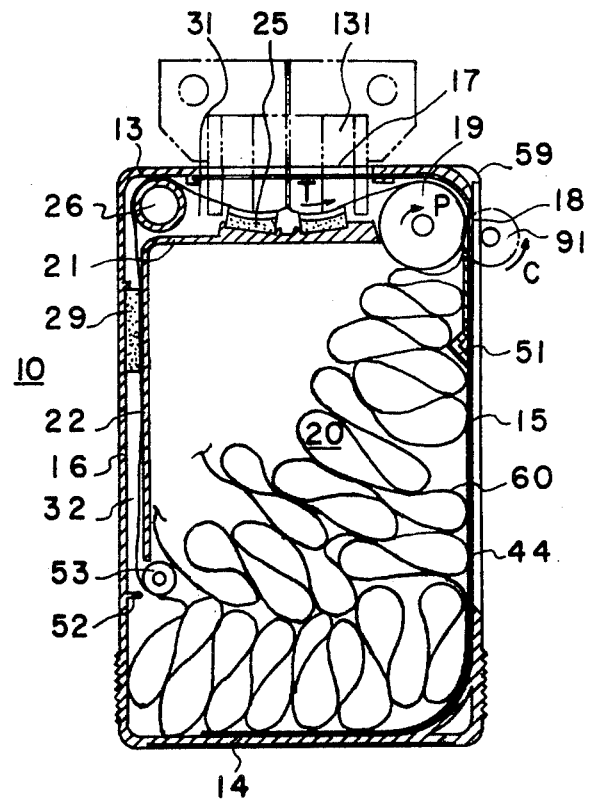
FIG. 8 is a sectional view similar to FIG. 6 illustrating the movement of an endless tape stored as random loops.

Next, referring to FIGS. 6 through 8, the internal structure of the tape cartridge 10 in accordance with the present invention and the resultant tape movements will be described. FIG. 6 is an enlarged sectional view taken along the line VI — VI of FIG. 5C taken in the direction of the arrows and FIG. 7 is an enlarged sectional view taken along the line VII — VII of FIG. 5B taken in the direction of the arrows, respectively with the tape 60 removed for the purpose of clarity. FIG. 8 is a sectional view similar to FIG. 6, illustrating the situation where the shutter 44 is opened, the tape 60 is stored in the form of a plurality of random loops, and a external magnetic head 131 and the external capstan 91 are partially inserted into the tape cartridge through the openings 17 and 18, respectively.

Referring to FIGS. 6 and 7, a first internal wall 22 preferably made of a plastic material extends along the first side wall 16 to form a narrow elongated first tape passageway 32 therebetween, and a second internal wall 21 made of a plastic material extends along the front internal wall 22 on the side of the front wall 13 to the vicinity of the pinch roller 19 to form a second tape passageway 31 therebetween. The second internal wall 21 has a felt or foam pad 25 facing opening 17 in front wall 13. The pad resiliently presses tape 60 passing thereon against a transducing surface of the magnetic head 131 (FIG. 8). Within the first tape passageway 32, a pad 29 made of felt, sponge, etc., on side wall 16 applies back tension to the tape to cause appropriate drag to tape 60. Guide pole 26 guides tape 60 from tape passageway 32 to the tape passageway 31. A ramp 51 projecting inwards from the second side wall 15 and spaced from pinch roller 19 (in FIGS. 6 and 8), of which operation will be described later in detail. Near the entry of the first tape passageway 32, there are provided a protrusion 52 projecting inwards from first side wall 16 toward guide roller 53. Roller 53 is rotatably mounted between the tip of protrusion 52 and one end of first internal wall 22. Protrusion 52 and the guide roller 53 constitute a second important feature of the present invention, of which operations and effects will be described later in detail.

In FIG. 6, the head receiving openings 17 and the capstan receiving opening 18 respectively formed in the front wall 13 and the second side wall 15 are selectively covered by shutter 44. The shutter 44 is slidable in shutter guide 57 extending along the front wall 13, the second side wall 15 and the back wall 14 between the closed position shown in FIG. 6 (corresponding to FIG. 4A) and the opened position shown in FIG. 8 (corresponding to FIG. 4B). As later described, the shutter 44 is automatically opened and closed by means of the detent 45 attached thereto.

FIG. 8 illustrates the tape movement in the tape cartridge 10 for storing and endless tape 60 therein in the form of a plurality of random loops. The tape 60 stored in the wide tape receiving cavity 20 at the center of the tape cartridge 10 in the form of random loops is guided into the first tape passageway 32 from the entry thereof between the tip of the protrusion 52 and guide roller 53, thence between the pad 29 and the first internal wall 22 towards the guide pole 26 and thence through the tape passageway 31 past pad 25 and transducer 131. Then, tape 60 is guided through the arcuate tape path around pinch roller 19 and thence between the pinch roller 19 and the capstan 91 which is extended into the tape cartridge through the opening 18, whereby driving force is applied to tape 60. When the capstan 91 is rotated in the direction indicated by the arrow C, the pinch roller 19 is rotated in the direction indicated by the arrow P, thereby causing the tape 60 to move in the direction indicated by arrow T.

Figure 9:
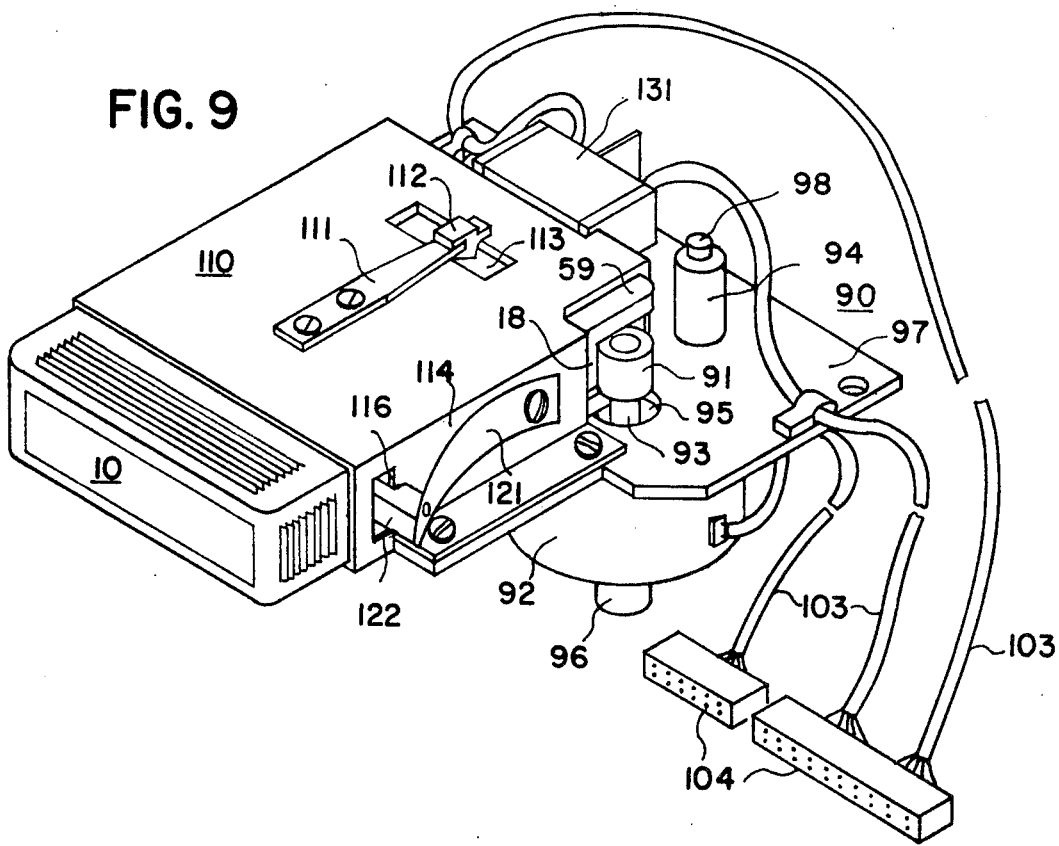
FIG. 9 is a perspective view illustrating an operational engagement between a capstan driving means and cartridge housing of a tape cartridge player with the tape cartridge using the present invention.
Figure 10:
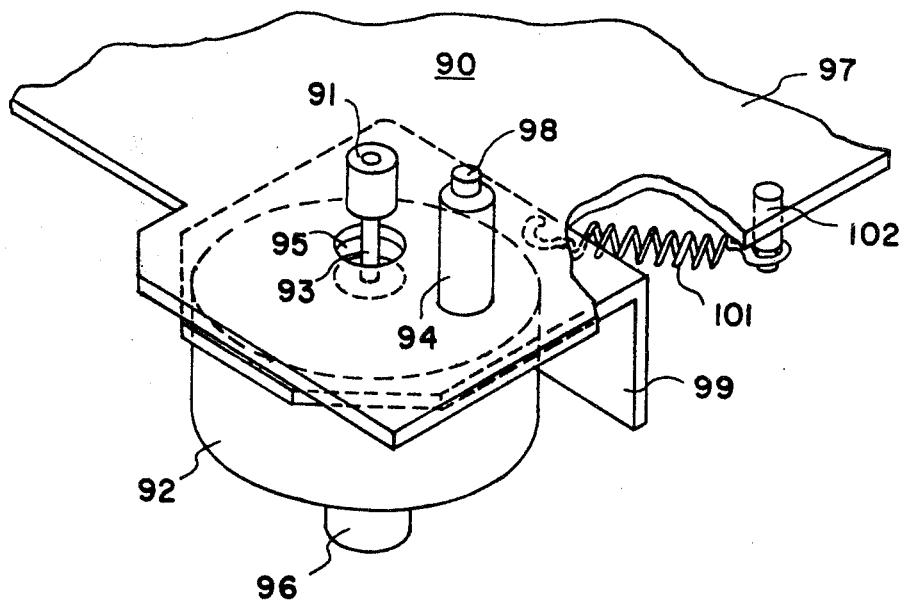
FIG. 10 is a perspective view illustrating the capstan driving means 90 of FIG. 9.

FIG. 9 is a perspective view illustrating the main parts of the tape cartridge player with cartridge 10 inserted to the playing position. FIG. 10 is a partly broken perspective view illustrating a part of the tape cartridge player shown in FIG. 9 to show the pivotal mounting of the capstan motor. The tape cartridge player consists of the capstan driving means 90 and the cartridge housing 110. The capstan driving means 90 comprises a capstan motor 92, a capstan 91 attached to one end of an output shaft 93 of motor 92, a bracket 99 fixed to motor 92 by using bolts or other appropriate means, a stud 98 fixed to said bracket 99 and projecting therefrom through base 97, a sleeve 94 fixed to said base 97 and projecting therefrom, a coil spring 101 fixed to a portion of said bracket at one end and to a stud 102 fixed to said base 97 at the other end, and a oneway clutch 96 attached to the other end of output shaft 93. The stud 98 is fit into sleeve 94 through the base 97 and engaged with said sleeve by appropriate means so that the bracket 99, accordingly the capstan 91, may be pivoted around but not axially to the axis of the stud 98. As the result, capstan 91 has a range of the pivoting movement restricted by the edge of hole 95. Bracket 99 is normally spring-biased by the coil spring 101, and therefore, the capstan 91 is normally applied with biasing pivoting force in the clockwise direction around the stud 98 to be pressed against the pinch roller 19 in tape cartridge 10.

On the upper wall of the cartridge housing 110, leaf spring 111 is fixed by using bolts or other appropriate means and supports a wedge-shaped engaging detent member 112 is fixed at its free end. The tip of the engaging member 112 makes retaining contact into recess 48 of top wall 11 of the cartridge 10 through an opening 113 formed in the upper wall of the housing 110 for securing the tape cartridge 10 into the fixed playing position.

The shutter 44 actuating mechanism has leaf spring 121 bolted on a side wall 114 of the housing 110. Shutter closing actuator 122 attached to the free end of spring 121 contacts the second side wall 15 of the tape cartridge 10 through an opening 116 formed in the side wall 114. At the position of the tape cartridge shown in FIG. 9, the tip of actuator 122 is engaged with the rear wall of the detent 45 such that when tape cartridge 10 is removed from the cartridge housing 110, the shutter 44 is automatically moved into the closed position by the engagement between the tip of the actuator 122 and the rear wall of the detent 45. A shutter opening actuator (not shown) is attached to the inside of the side wall 114 of the housing and cooperates with the detent 45 to move the shutter 44 automatically into the opened position as the cartridge 10 is inserted into the player.

As shown in FIG. 9, capstan 91 extends into the cartridge 10 through the opening 18 and presses against the pinch roller 19 within the tape cartridge. The transducing surface of the head 131 is pressed against the tape through the opening 17 formed in the front wall 13 of the tape cartridge. The electric wiring 103 for the head 131 and the capstan motor 92 is connected to electric circuits (not shown) via connectors 104.

Figure 11:
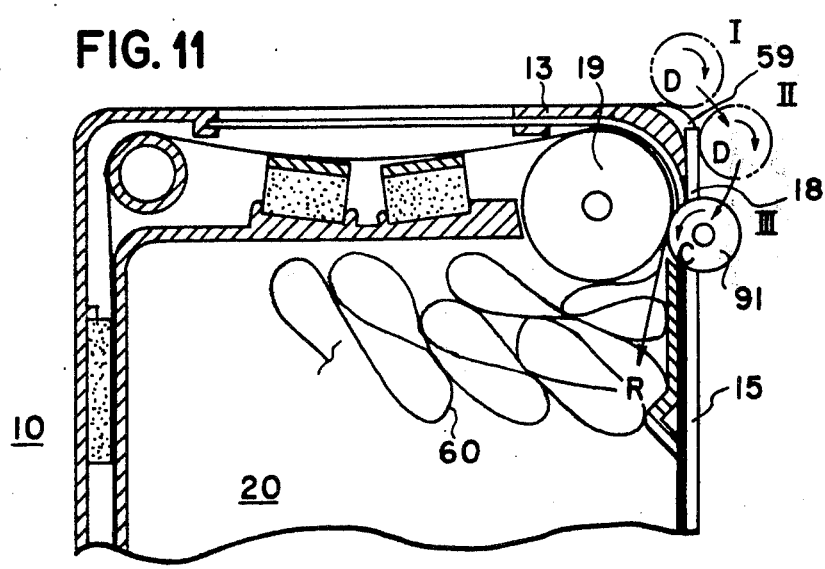
FIG. 11 is an enlarged partial sectional view of the FIG. 8 illustrated cartridge illustrating the positional relationship between a tape cartridge and capstan during the insertion operation of a tape cartridge into a record player.

Next, referring to FIG. 11, the engagement between the pinch roller 19 of the tape cartridge 10 of the present invention and the external capstan will be explained. When the cartridge 10 has been removed from the housing 110 (FIG. 9), the capstan 91 is spring-biased so as to be slightly extended into the travel path of a corner 59 of the cartridge 10 during the insertion operation thereof. As the tape cartridge 10 is inserted into the housing 110, the capstan 91 is first engaged with corner 59 of tape cartridge 10 as shown by dashed line circle I in FIG. 11, and as the tape cartridge is further inserted, the capstan 91 is moved around the stud 98 (FIG. 10) in the counterclockwise direction against the biasing force of the spring 101 (FIG. 10) as shown by dashed line circle II in FIG. 11. When the tape cartridge 10 has been inserted into the fixed playing position, capstan 91 is engaged with the pinch roller 19 through the opening 18 by said biasing force. When the tape cartridge is removed from the housing, the capstan 91 relatively moves in the reverse sequence of III - II - I.

As stated above, it is an important feature of the present invention that the capstan receiving opening 18 is provided in the side wall 15 rather than in the front wall 13 in prior art tape cartridges. In other words, the tape driving force is transmitted from the capstan 91 to the tape 60 on the downstream side of the narrow curved tape path through which the tape is hard to pass, namely the arcuate tape path defined between the outer periphery of the pinch roller 19 and the inner wall of the corner 59, rather than on the upstream side thereof. Accordingly, tape 60 is pulled, not pushed, through such narrow arcuate tape path. Further, since tape 60 has appropriate drag or back tension by the pad 29 within the tape passageway 32, the tape 60 is always kept in contact with the outer periphery of the pinch roller 19 as it is pulled by capstan 91. This action prevents contact with the inner wall of the cartridge facing pinch roller 19. As the result, there is no frictional contact between the tape and the inner wall of the cartridge facing to the pinch roller such as experienced in the prior art tape cartridges. Thus, the problems of tape jamming and tape creasing at this portion as well as tape protrusion out of the tape cartridge are solved in accordance with the present invention.

It has been determined that more preferable results may be obtained for the smooth movement of the tape when the direction of the driving force applied to the tape at the capstan-pinch roller contact point, namely the direction R of a tangential line (FIG. 11) at the contact point between the pinch roller 19 and the capstan 91, is not parallel to the side wall 15 but directed slightly inwardly of the tape cartridge. The angle of such inward inclination is not critical and any approrpriate value may be selected therefor depending upon other design requirements. Also, the ramp 51 projecting inwards from the side wall 15 deflects tape 60 from side wall 15 towards the center of the tape receiving cavity 20. With ramp 51, tape 60 tends to be always folded into a plurality of loops of substantially the same size and the tape movement as a whole within the tape receiving cavity 20 may be directed substantially diagonally from the capstan-pinch roller contact point towards the entry of the first tape passageway 32.

As stated above, when the tape cartridge 10 is inserted into the housing 110, the capstan 91 is sequentially located into the positions shown by I, II and III. Therefore, on the stages I - II and II - III, the periphery of the capstan 91 rubs on corner 59 and the side wall 15 of the tape cartridge and the capstan is thereby driven to be rotated in the clockwise direction, as shown by the arrow D. Since the capstan motor 92 is not actuated during the insertion operation of the tape cartridge 10, the capstan 91 is rotated in the direction shown by the arrow D, reverse to the direction of the rotation of the capstan 91 shown during tape driving operations. Such reverse rotation may cause tape protrusion out of the clearances of the openings 17 and 18. Since a capstan motor rotor having large inertia is directly connected to the capstan 91 and hence the capstan once driven to be rotated continues its rotation for a longer period, such tape protrusion could continue. Such tape protrusion must be prevented for the reasons explained before with reference to FIG. 2A. In order to solve the problem, in accordance with an additional feature of the present invention, one-way clutch 96 is attached to the other end of the shaft 93 to which the capstan 91 is attached to allow the rotation of the capstan only in the direction C in which the tape is to be driven and prevent its rotation in the reverse direction D, as shown in FIGS. 9 and 10.

Figure 12A:
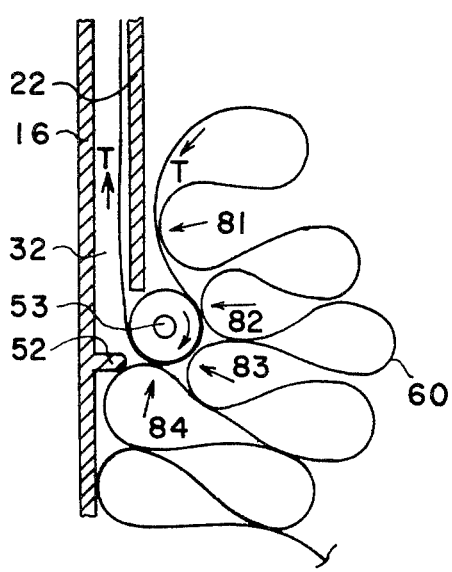
FIGS. 12A and 12D illustrate tape loop patterns and the prevention of tape jamming, tape creasing, and undue drag applied to the tape movement near the entry of the tape passageway in the tape cartridge of the present invention.
Figure 12B:
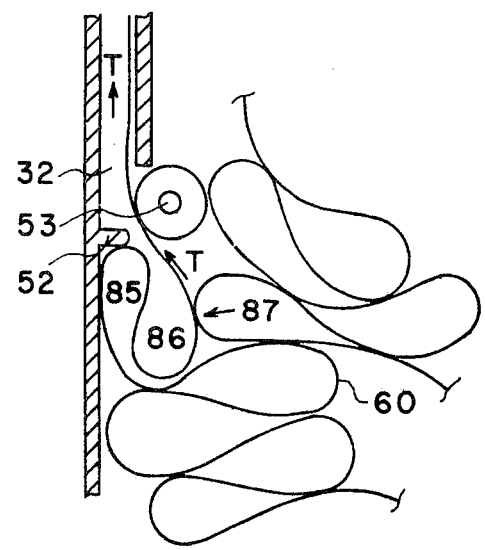
Figure 12C:
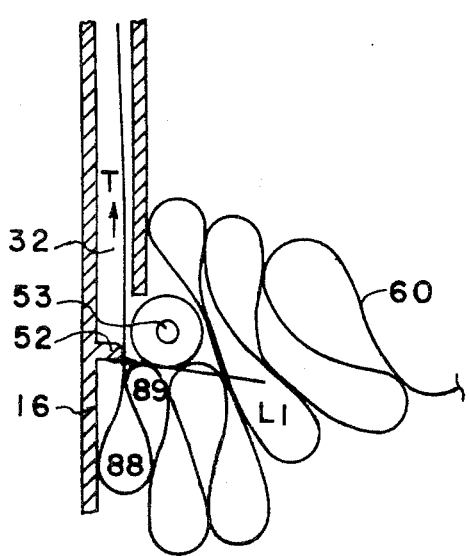
Figure 12D:
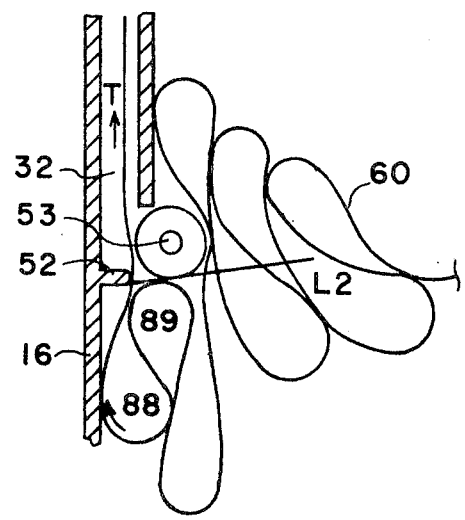

FIGS. 12A through 12D show a feature of the present invention to the prevention of tape creasing and undue drag applied to the tape movement at the entry of the tape passageway 32 in the tape cartridge for storing an endless tape therein in the form of random loops. FIG. 12A illustrates a tape loop pattern corresponding to the tape loop pattern illustrated in FIG. 3A showing of a prior art tape cartridge. In FIG. 12A, a tape 60 is pushed toward the tape passageway 32 past the guide roller 53 with pressure applied to the tape by the tape loops 81, 82, 83 and 84 in the directions shown by the unnumbered arrows. Although a portion of the tape 60 is pushed toward passageway 32, no tension is imposed on tape 60 for friction between tape 60 and the periphery of the guide roller 53, thereby preventing undue drag to the tape movement as experienced in the prior art tape cartridge shown in FIG. 3A. Another tape loop pattern illustrated in FIG. 12B corresponds to the tape loop pattern illustrated in FIG. 3B. In FIG. 12B, two tape loops 85 and 86 are formed in the immediate vicinity of the entry of the tape passageway. In this case, the protrusion 52 prevents the tape loop 85 from being pushed into tape passageway 32 together with the tape loop 86. For the purpose of comparison with FIG. 12D, FIG. 12C shows the guide roller 53 intentionally located downwards (towards the back wall) from its proper positions as shown in FIGS. 12A, 12B, and 12D. In this arrangement, a line L1 extending from the tip of the protrusion 52 makes tangential contact with the periphery of the guide roller 53 and an acute angle with a portion of the side wall 16 extending from the protrusion 52 towards the back wall, the tape loops 88 and 89 formed in the area defined by the line L1 and said portion of the side wall 16 tend to be confined within said area. This arrangement results in a high possibility of the tape loop 89 being guided into the tape passageway 32 together with the tape loop 88 and of their creasing as the tape is guided into the tape passageway 32. FIG. 12D is a view corresponding to FIG. 12C but showing the guide roller 53 located at its proper position. In this case, since a line L2 extending from the tip of the protrusion 52 makes tangential contact with the periphery of the guide roller 53 and an obtuse angle with said portion of the side wall 16 the tape loop 89 formed in the area defined by the line L2 and said portion of the side wall 16 can get away from said area along the line L2 to the right (in FIG. 12D), resulting in no possibility of the tape loop 89 being guided into the tape passageway 32 together with the loop 88.

The height $h$ of the protrusion 52 (FIG. 6) is not particularly critical, but too short or long protrusions are not preferable because in the former case the tape loop 85 in the state of the tape loop pattern as shown in FIG. 12B cannot be prevented from being guided into the tape passageway 32 together with the tape loop 86. In the latter case, the tape 60 must go around the tip of the protrusion 52 to be guided into the tape passageway 32, resulting in undue drag on tape movements. The gap G (FIG. 6) between the tip of the protrusion 52 and the outer periphery of the guide roller 53 must be narrow enough to prevent the tape loops 84, 85 and 89 in FIGS. 12A, 12B and 12D, respectively, from being guided into the tape passageway 32 but wide enough to prevent undue drag from being applied to tape movements. Such size is determined by measurements as being a function of tape parameters.

For illustrative purposes, the dimensions of the portions of the tape cartridge in accordance with a preferred embodiment of the present invention will be shown below. W, $h$, G, $d$, and D are dimensions as shown in FIG. 6.

Tape Cartridge: 54 mm (Width) × 86mm (Length) × 15 mm (Height)
Tape: 6.35 mm in width, 1900 mm in length (for a random loop type tape cartridge)
W: 2.5 mm
$h$: 2.3 mm
G: 1.0 mm
$d$: 0.5 mm
D: 5.0 mm As stated heretofore, in accordance with the present invention, a tape cartridge having a high reliability enough to be used with a digital data recorder has been provided, wherein tape jamming and tape creasing in the tape path near the pinch roller and tape protrusion out of the clearance of the capstan receiving opening may be completely prevented and also tape creasing and undue drag to the tape movement near the entry of the narrow tape passageway extending along the side wall of the tape cartridge may be effectively prevented.

While the present invention has been particularly shown and described with reference to an endless magnetic tape stored in the form of random loops, it should be understood that the present invention may also be applied to other tapes such as an ink ribbon, a photographic film, etc., whether endless or not. Further, one of the features of the present invention, namely the technical concept of providing a capstan receiving opening in a side wall of a cartridge, may be also applied to such single-reel type endless type cartridges as shown in FIGS. 13A and 13B, and a second feature of the present invention, namely the mechanism consisting of a bank and a guide roller, may be also applied to a single-reel type endless tape cartridge wherein the tape is moved in the forward direction after it is backspaced by a predetermined distance, thereby obtaining completely the same effects as the case of a random-loop type tape cartridge.

What is claimed is:

1. A tape cartridge comprising a hollow container having a tape receiving cavity for storing an elongated tape therein, a peripheral wall having a front wall portion joined by first and second parallel side wall portions further joined by a rear wall portion, tape being adapted to move from said cavity along said second wall portion, thence along said front wall portion, an internal wall extending in spaced relationship to said second side wall of said hollow container to define a narrow elongated tape passageway therebetween, one end of said tape passageway facing said rear wall portion opening to said tape receiving cavity in a predetermined spacing from said rear wall portion, and tape guide means for guiding said tape from said narrow longitudinal elongated tape passageway to said tape receiving cavity;

characterized in that:
protrusion means extend inwardly from said second side wall portion adjacent said one end of longitudinal tape passageway and being intermediate said rear wall portion and said one end; and
a guide roller rotatably mounted adjacent to and intermediate said one end and said protrusion means to define a narrow entry area to said tape passageway between said protrusion means and periphery of said guide roller not extending closer to said rear wall portion than said protrusion means nor closer to said second side wall portion than said internal wall is spaced from said second wall, whereby said protrusion means and said guide roller cooperate to prevent the tape from creasing and undue drag from being applied to the tape at the entry to said tape passageway from tape cavity.

2. The tape cartridge set forth in claim 1 further including an inwardly facing concave arcuate wall portion joining said front and first wall portions;
said arcuate wall portion having a given center of curvature; and
said first wall portion having a capstan receiving opening disposed adjacent said arcuate wall portion and disposed intermediate a plane parallel to said front wall portion and extending through said center of curvature and a plane extending through said rear wall portion.

3. A tape cartridge having a container consisting of top and bottom walls joined by a peripheral wall having front, rear, and first and second side wall portions, one of said portions having an opening, tape guide means in said container extending adjacent to said opening, an inner wall extending in a closely spaced relation from said second side wall portion and extending between said tape guide means and a first end at a predetermined point spaced from said rear wall portion with a longitudinal tape passageway therebetween;
the improvement characterized in that:
anti-crease means are disposed in said cavity adjacent said first end of said inner wall and including means protruding from said second wall portion for limiting access to said longitudinal tape passageway to an area remote from any of said wall portions.

4. The tape cartridge set forth in claim 3 further characterized in that:
said anti-crease means includes a rotatable guide roller disposed in juxtaposition to said one end and having a tape engaging periphery extending no closer to said second wall portion than a width of said longitudinal tape passageway and no closer to said rear wall portion than said protruding means and being spaced from said protruding means.

5. The tape cartridge set forth in claim 4 further characterized by tape in said cartridge stored in said cavity as predetermined random loops;
unidirectional tape transfer means in said tape guide means; and
ramp means extending into said cavity from said first wall portion adjacent said tape transport means for aiding formation of said predetermined loops in said cavity.

6. A tape player for operating with a tape cartridge having top and bottom facing walls, front and back facing walls joining said top and bottom walls, first and second side walls joining said walls to form a tape enclosure, a pinch roller rotatably mounted about an axis of rotation near a corner defined by said front and first side walls, said first side wall having an aperture facing said pinch roller;
  a cartridge housing for removably receiving said cartridge for operation, said cartridge being adapted to be inserted into said housing with said front wall being a leading plane;
  capstan means rotatably mounted to a stationary base and normally biased to extend into the travel path of said cartridge during the insertion operation thereof such that as the cartridge is inserted into the housing said capstan means first engages a corner of said cartridge and then it is retracted generally transversely to the direction of the insertion of said cartridge against the biasing force and as the cartridge is further inserted it engages said pinch roller through said aperture means;
  a tape in said cartridge which is driven during operation by said pinch roller and said capstan means only in the forward direction around pinch roller; and
  back-rotation preventing means coupled to a shaft of said capstan means to prevent back rotation thereof.

7. The tape player set forth in claim 1 wherein said aperture is located in said first side wall on a rear wall side of a plane extending parallel to said front wall through said axis of rotation whereby transporting forces exerted on said tape lie along a line directed inwardly of said tape cartridge.

* * * * *